No. 619,457. Patented Feb. 14, 1899.
V. WISNIEWSKI.
AUTOMATIC DEVICE FOR DETACHING HORSES FROM VEHICLES.
(Application filed Aug. 5, 1898.)
(No Model.) 2 Sheets—Sheet 1.
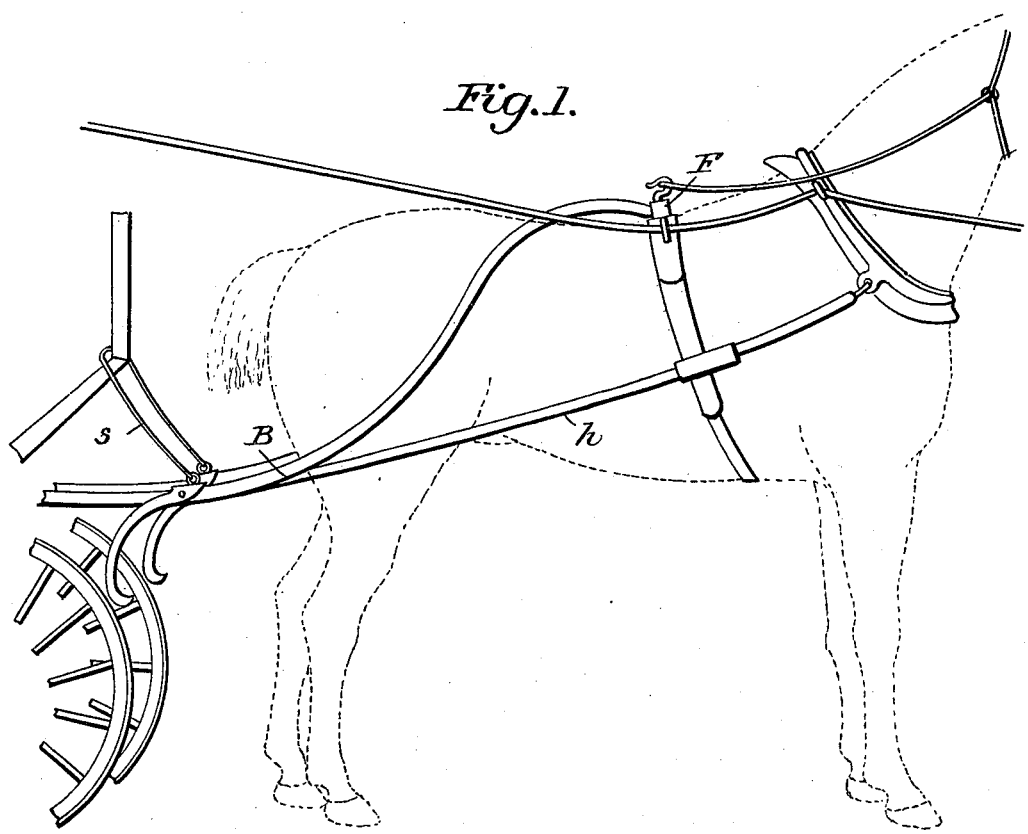
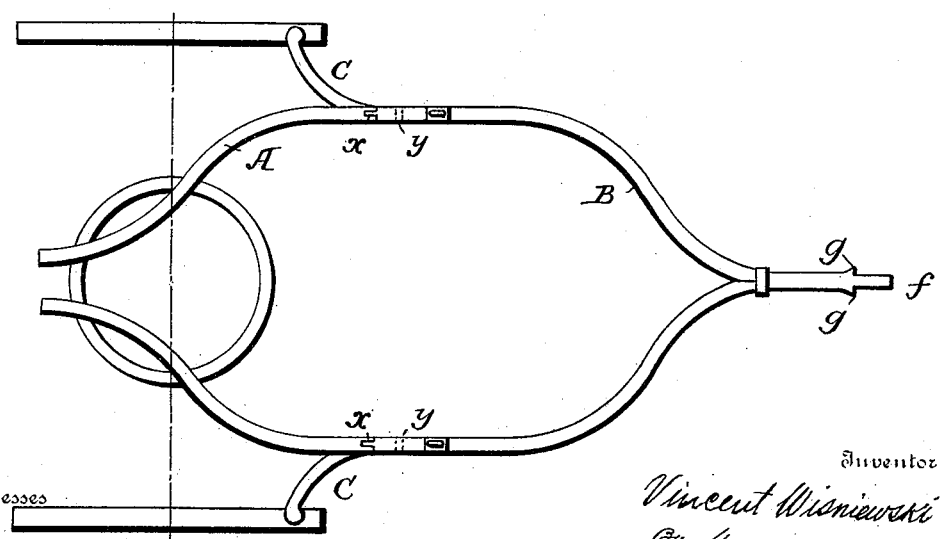

No. 619,457. Patented Feb. 14, 1899.
V. WISNIEWSKI.
AUTOMATIC DEVICE FOR DETACHING HORSES FROM VEHICLES.
(Application filed Aug. 5, 1898.)
(No Model.) 2 Sheets—Sheet 2.

Witnesses
J. G. Hinkel
William E. Neff

Inventor
Vincent Wisniewski
By Watson & Watson
his Attorneys

UNITED STATES PATENT OFFICE.

VINCENT WISNIEWSKI, OF BERLIN, GERMANY.

AUTOMATIC DEVICE FOR DETACHING HORSES FROM VEHICLES.

SPECIFICATION forming part of Letters Patent No. 619,457, dated February 14, 1899.

Application filed August 5, 1898. Serial No. 687,856. (No model.)

*To all whom it may concern:*

Be it known that I, VINCENT WISNIEWSKI, architect, a subject of the Emperor of Germany, residing at Berlin, in the German Empire, have invented new and useful Improvements in Automatic Devices for Unteaming Horses, of which the following is a specification.

My invention relates to an arrangement by which the draft-hook with which the trace is connected will be detached automatically from the carriage or wagon in case the horse falls to the ground, while at the same time a wheel-brake may be caused to act so as to prevent the wagon from running upon the horse, whereas should the horse only stumble or fall partly—as, for instance, upon his knees—these devices will remain inoperative.

I have shown my invention in the accompanying drawings, in which—

Figure 3:
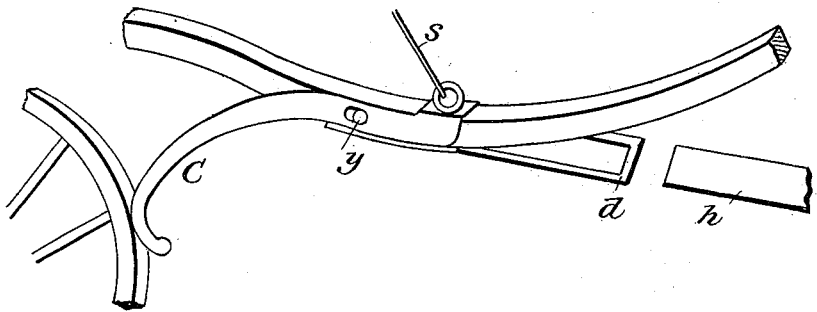
Figure 5:
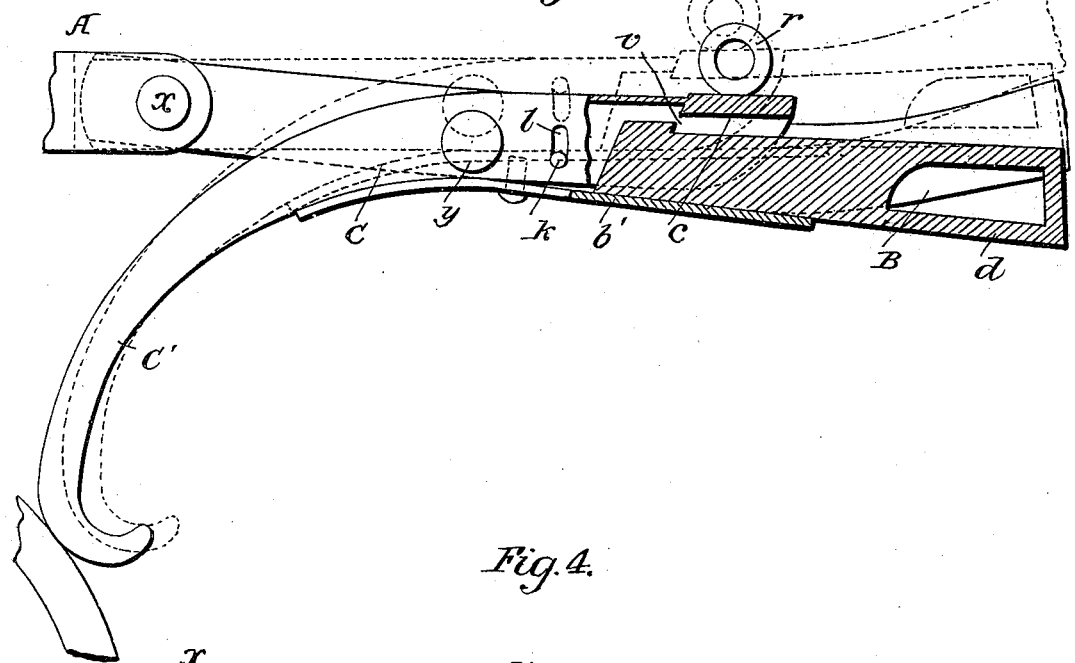
Figure 4:
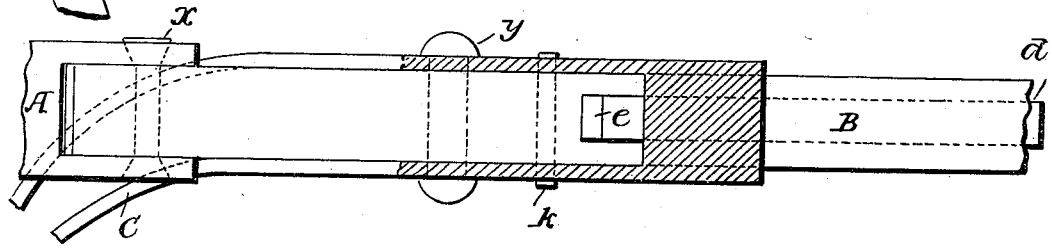

Figure 1 is a side elevation of my device, the horse being indicated by dotted line. Fig. 2 is a top plan view of the shackle or pole. Fig. 3 is a perspective view of part of the pole, the draft-hook, and the brake. Fig. 4 is a horizontal section through a part of one arm of the pole at the place where the draft-hook connects. Fig. 5 is a side view, partly in section, of the braking and releasing devices, illustrating their operation.

Similar letters indicate the same parts throughout the several views.

A is the fork, in each end of which there is pivoted at $x$ one arm of the pole or shackle B. These arms are elastic, preferably made of metal. They are bent as shown in Figs. 1 and 2 and united at their forward ends, terminating in a pin $f$, having shoulders $g$. This pin enters loosely into a socketed support F upon the harness-saddle, and the shoulders $g$, bearing against the rear of the support, prevent the pin from passing forward through the support and injuring the horse, while the pin can easily slip out of the shell on the rear side.

Near the rear end of each of the pole-arms is a detaching device consisting of a clutch, one member of which is the draft-hook $d$, attached to the trace $h$ and extending into a recess $e$ in the shaft, the other member C being pivoted to the shaft-arm by a pin $y$. The forward part of the member C, as shown in the drawings, extends over the top and sides of the shaft, and the top part has a thickened portion, forming a catch $c$, which extends across the recess $e$ and is adapted to engage with the projection $v$ of the draft-hook. The movement of the member C about its pivot is limited by a stop-pin K, passing through the shaft-arm and extending into vertical slots $l$ in said member. The draft-hook is normally held in engagement with the catch $c$ by a spring $b'$. An eye $r$ is affixed to the catch $c$, and a strap $s$ is secured to the eye and extends within reach of the driver, so that the latter may in case of an accident or emergency or whenever desirable release the clutch members by pulling on the strap, and thus drawing the catch out of engagement with the draft-hook. When the draft-hook becomes released, the forward movement of the horse withdraws the support F from the end of the pole, and the horse is free.

The clutch members C are, as shown in the drawings, provided with extensions $c'$, which project downwardly and outwardly, terminating in front of the forward wheel-tires. When the shaft is in the raised position, as shown in dotted lines, Fig. 5, these extensions will not come in contact with the wheels; but should the shaft be lowered a sufficient distance the extensions will bear against the wheels, thus forming wheel-brakes. After the extensions or stop-arms $c'$ have come into contact with the wheels their movement will be arrested. A further downward movement of the shaft will force the draft-hooks downward out of engagement with the catches $c$, as shown in full lines, Fig. 5, and the hooks may be withdrawn. Any further downward movement of the shaft after the stop-pins K have reached the bottom of the slots $l$ will force the stop-arms $c'$ firmly against the wheels, and thus exert a braking action which will stop the wagon.

It will be readily seen that if the animal merely stumbles or falls to his knees the shaft will not be lowered sufficiently to release the clutch or set the brake; but should he fall completely the clutch will be released and the brake set, as above described.

Instead of having the extensions $c'$ bear against the wheels for the purpose of braking when the shaft is lowered they may be arranged to bear against any other suitable part of the vehicle or a stop of any kind to limit the movement of the member C, so that the depression of the shaft will operate to force the draft-hook out of engagement with the catch on said member. By the arrangement shown in the drawings, however, said extensions fulfil the double purpose of brakes and stop-arms for the clutch member C.

Having thus particularly described and ascertained the nature of my invention, I declare that what I claim is—

1. The combination with a vehicle, of a shackle or pole pivoted thereto, a detachable clutch-joint in said shackle or pole, and means for releasing said joint automatically when the shackle or pole is lowered, substantially as described.

2. The combination with a vehicle, of a shackle or pole pivoted thereto, a brake connected with said shackle or pole and adapted to be applied to the wheels when the pole is lowered, and a detachable clutch-joint in said shackle or pole constructed to be opened automatically when the pole is lowered, substantially as described.

3. The combination with a vehicle, of a shackle or pole pivoted thereto, a pair of brake-pieces connected to said shackle or pole and constructed to bear upon the forward wheels of the vehicle when the pole is lowered, a detachable clutch-joint in said shackle or pole and draft-hooks connected thereto in front of said joints, whereby the draft-animal may be automatically released from the vehicle and the brakes applied should the animal fall to the ground, substantially as described.

4. The combination with a vehicle, of a shackle or pole pivoted thereto, a detachable clutch-joint in said shackle or pole, and means for releasing said joint automatically when the shackle or pole is lowered, said clutch being so constructed and arranged that it may be opened by the driver to release the draft-animal, substantially as described.

5. The combination with a vehicle, of a shackle or pole pivoted thereto, and a detachable clutch-joint in said shackle or pole, said clutch comprising a member arranged to be lowered to open the clutch automatically when the draft-animal falls and a member arranged to be raised by the driver to open the clutch and release the draft-animal at any time, substantially as described.

In witness whereof I have hereunto signed my name, this 22d day of July, 1898, in the presence of two subscribing witnesses.

VINCENT WISNIEWSKI.

Witnesses:
C. H. DAY,
HENRY HASPER.